Figure 1:
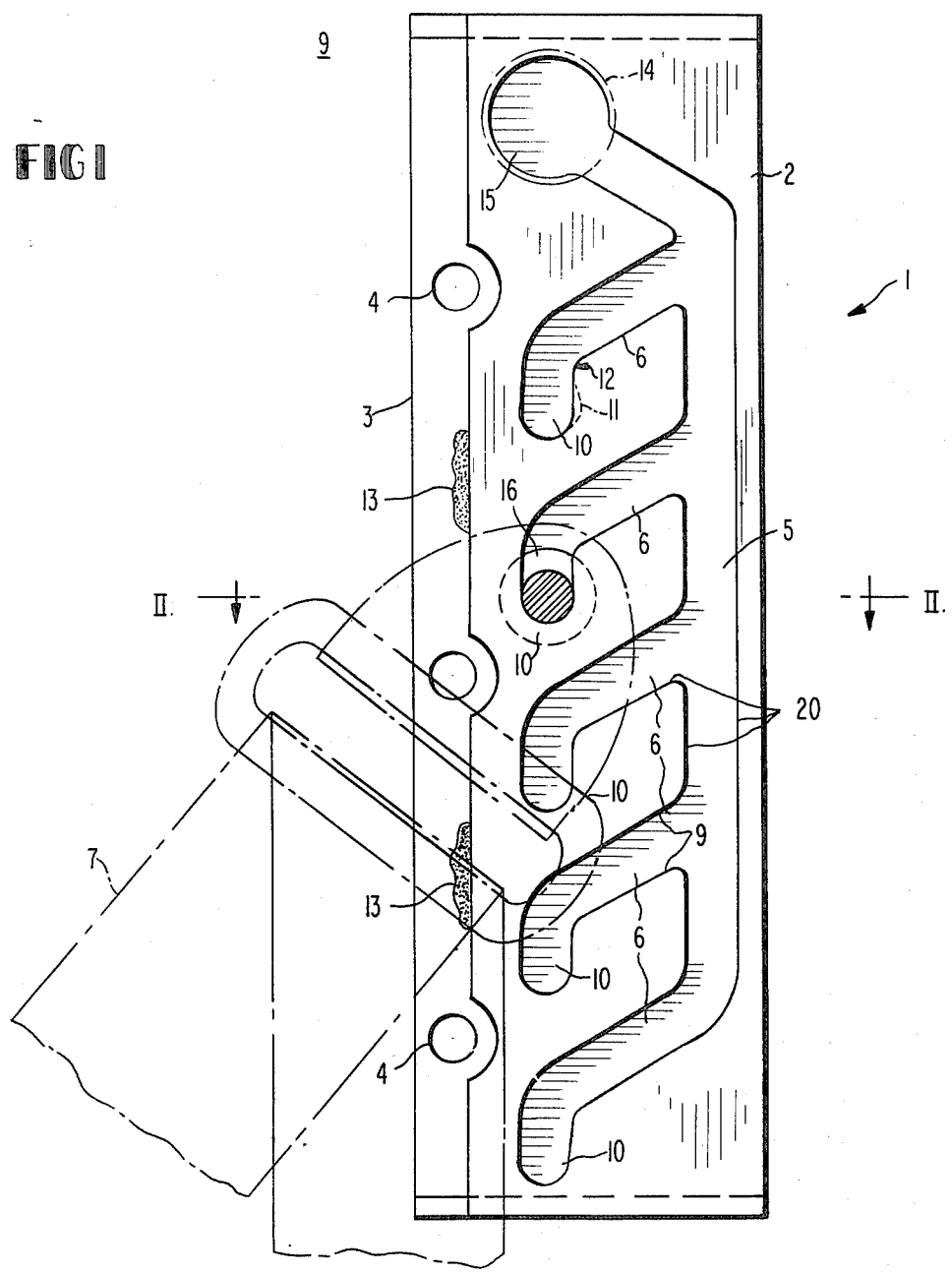

United States Patent [19]

Krzok

[11] 4,225,185
[45] Sep. 30, 1980

[54] VERTICALLY ADJUSTABLE MOUNTING ARRANGEMENT FOR SAFETY BELTS AT A SIDE RAIL OF AN AUTOMOTIVE VEHICLE

[75] Inventor: Peter Krzok, Leutenbach, Fed. Rep. of Germany

[73] Assignee: Daimler-Benz Aktiengesellschaft, Fed. Rep. of Germany

[21] Appl. No.: 26,771

[22] Filed: Apr. 3, 1979

[30] Foreign Application Priority Data

Apr. 13, 1978 [DE] Fed. Rep. of Germany ....... 2815918

[51] Int. Cl.² .............................................. A62B 35/00
[52] U.S. Cl. .................................... 297/468; 280/801; 297/483
[58] Field of Search ............... 297/483, 481, 484, 468; 182/4; 280/808, 802, 801; 105/482; 24/129 B, 130, 136 R

[56] References Cited

U.S. PATENT DOCUMENTS

| 3,521,901 | 7/1970 | Wackym | 280/808 X |
| 3,618,975 | 11/1971 | Bombach | 297/483 |
| 3,713,616 | 1/1973 | Bowers | 105/482 |
| 3,964,798 | 6/1976 | Burleigh | 280/808 X |

FOREIGN PATENT DOCUMENTS

| 2303222 | 8/1974 | Fed. Rep. of Germany | 297/483 |
| 2344287 | 3/1975 | Fed. Rep. of Germany | 280/808 |
| 2460092 | 6/1976 | Fed. Rep. of Germany | 280/808 |
| 2622556 | 1/1977 | Fed. Rep. of Germany | 297/483 |
| 716051 | 9/1954 | United Kingdom | 182/4 |
| 1367248 | 9/1974 | United Kingdom | 297/483 |

Primary Examiner—James T. McCall
Attorney, Agent, or Firm—Craig & Antonelli

[57] ABSTRACT

A vertical or height adjustable mounting arrangement for safety belts of a vehicle which enables a stepwise variable adjustment of an abutment height of a deflecting or end member of the safety belt. The mounting arrangement includes a mounting plate having a vertically extending slot and a plurality of lateral slots extending from the vertically extending slot. The lateral slots extend obliquely downwardly and toward a front of the vehicle so as to define a plurality of individual catching points for an adjusting member of the safety belt and for holding the deflecting or end member of the safety belt. A drop slot is provided at the end of each of the lateral slots with the drop slot being offset downwardly with respect to the lateral slot and having a length which is at least twice a width of the lateral slots so as to form an automatically effective gravity-caused locking of the adjusting member in an end position of the lateral slots.

6 Claims, 2 Drawing Figures

VERTICALLY ADJUSTABLE MOUNTING ARRANGEMENT FOR SAFETY BELTS AT A SIDE RAIL OF AN AUTOMOTIVE VEHICLE

The present invention relates to a safety belt arrangement and, more particularly, to a vertical or height adjustable mounting arrangement for safety belts which arrangement is adapted to be mounted at a side rail of an automotive vehicle at seat-shoulder level and which arrangement permits a stepwise variability of an abutment height of a deflecting or end member of the safety belt.

A safety belt for restraining occupants of a vehicle, especially for automotive vehicles, has been proposed wherein a box-shaped housing is provided and arranged at a vehicle frame part in an essentially vertical manner with the housing having a receiving aperture and several recesses arranged at varying levels for engaging a mounting pin guided in a receiving aperture and connectable with a fastening or deflection fitting. The mounting pin is held in the respective recesses by a spring-loaded pressure plate.

A disadvantage of the aforementioned proposed arrangement resides in the fact that, aside from a possible breaking of the spring by dynamic forces caused upon an impact, the mounting pin may readily jump out or be displaced from the recess if the bias of the pressure plate is not strong enough. However, if the spring bias is too large, the mounting pin can then only be shifted for the purposes of adjustment with considerable difficulties.

An anchoring member for a safety belt has been proposed wherein an oblong load-absorbing mounting means is provided which includes a series of stops along the length thereof with a sliding element being attached on the mounting means for an anchoring of the safety belt. The sliding element is adapted to be moved for selective engagement with the series of stops and a pretensioning means is provided for holding the sliding element in engagement with a selected stop.

As with the first proposed construction, the sliding element or adjusting member is held in the respective stops formed, for example, as slots, by means of a spring bias. Although the sliding element can be arrested in a selected cutout by tightening a screw, the step of tightening requires a tool and/or an additional working step which is normally ommitted whereby the sliding element can then readily jump out or be displaced from the slot or cutout.

To provide for a vertical or height adjustment, a vertically extending slot may be provided in a mounting member with several lateral slots extending obliquely and downwardly toward the front of the vehicle from the vertically extending slot such that the several lateral slots form different catching points for an adjusting bolt slidable in the slots so as to hold the deflecting or end member of the safety belt.

The aim underlying the present invention essentially resides in providing a vertical or height adjustable mounting arrangement for a safety belt for a motor vehicle which simplifies the selective vertical adjustment of the deflecting or end member of the safety belt and reliably prevents an unintended escape of the adjusting bolt or pin of the safety belt from the mounting arrangement.

In accordance with advantageous features of the present invention, the lateral slots are each offset in a downward direction at each of their end zones so as to form a drop slot 10 having a length which is at least twice a width of the slot whereby the drop slot constitutes an automatic effective gravity-caused locking of the adjusting pin or bolt at an end position of the lateral slots.

By virtue of the above-noted features of the present invention, the adjusting pin or bolt is reliably held in the respective lateral slot and can readily, without expending and considerable force, be brought into another desired position.

In accordance with a further feature of the present invention, at a transition point or area between the obliquely extending portion of the lateral slot and the drop slot, a stop lug, which at least approximates a right angle or has an acute angle, is provided so that the gravity-caused locking of the adjusting bolt in the lateral slot is additionally secured by the stop lug.

In accordance with still further features of the present invention, the longitudinal slot may pass over into a bore which is adapted to be sealed by a plug. The bore is provided for enabling an insertion of a bolt or pin head of the adjusting bolt or pin which is provided with a peripheral groove having a width corresponding to a thickness of a mounting plate of the mounting arrangement so that the bolt head defines lateral flanges which extend beyond rims or edges of the longitudinal slot and/or the lateral and drop slots.

Accordingly, it is an object of the present invention to provide a vertical or height adjustable mounting arrangement for vehicle safety belts which avoids, by simple means, shortcomings and disadvantages encountered in the prior art.

Another object of the present invention resides in providing a vertical or height adjustable mounting arrangement for vehicle safety belts which automatically insures a locking of an adjusting bolt or pin of the safety belt at preselected vertical positions.

A further object of the present invention resides in providing a vertical or height adjustable mounting arrangement for vehicle safety belts which reliably prevents an unintentional displacement of the adjusting pin or bolt from the mounting arrangement.

Yet another object of the present invention resides in providing a vertical or height adjustable mounting arrangement for vehicle safety belts which is simple in construction and therefore relatively inexpensive to manufacture.

A still further object of the present invention resides in providing a vertical or height adjustable mounting arrangement for vehicle safety belts which functions reliably even under impact loads.

Figure 2:
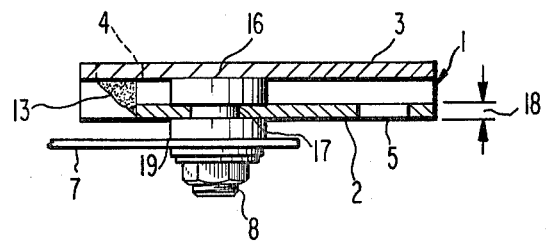

These and other objects, features, and advantages of the present invention will become more apparent from the following description when taken in connection with the accompanying drawings which show, for the purposes of illustration only, one embodiment in accordance with the present invention, and wherein:

FIG. 1 is a side elevational view of a vertical or height adjustable mounting arrangement for vehicle safety belts in accordance with the present invention; and FIG. 2 is a cross-sectional view of the mounting arrangement taken along the line II—II in FIG. 1.

Referring now to the drawings wherein like reference numerals are used in both views to designate like parts and, more particularly, to FIG. 1, according to this figure, a vertical or height adjustable mounting arrangement for vehicle safety belts includes a housing generally designated by the reference numeral 1 which housing is made of, for example, sheet metal parts, a top mounting plate 2, and a bottom mounting plate 3 having bores 4 in a portion thereof which extends beyond an edge or end of the top mounting plate 2 for accomodating mounting screws (not shown) by means of which the housing 1 can be substantially vertically attached to a vehicle frame part such as, for example, a lateral rail or lateral support member.

A vertically extending longitudinal slot 5 is provided in the mounting plate 2 from which slot 5 extend several lateral slots 6. The lateral slots 6 are disposed so as to extend obliquely downwardly and in a forward direction of the vehicle. The lateral slots 6 form catching points at varying levels for accommodating an adjusting pin or bolt 8 holding a safety belt 7. The lateral slots 6 are each offset downwardly in their respective end zones so as to form a drop slot 10 having a length which is at least twice a width 9 of the lateral slots 6 thereby enabling the formation of an automatic acting gravity-evoked locking of the adjusting pin or bolt 8.

A stop lug 12 may be provided in an inside region 11 of a transition point between the obliquely extending portion of the lateral slots 6 and the drop slot 10. The stop lug 12 may approximate a right angle or be of an acute angle. The bottom plate 3 and the top mounting plate 2 may be connected together by, for example, welding seams 13 or the like.

A bore 15, adapted to be sealed by a plug 14, is provided in the top mounting plate 2. The bore 15 passes over into the vertically extending longitudinal slot 5.

As shown most clearly in FIG. 2, the bore 15 is provided for enabling an insertion of a pin or bolt head 16 of the adjusting pin or bolt 8. The pin or bolt head 16 is provided with a peripheral groove generally designated by the reference numeral 17. The groove has a width corresponding to a thickness 18 of the mounting plate 2 so that lateral flanges 19 of the bolt head 16 extend over rims 20 of the longitundinal slot 5 and/or of the lateral and drop slots 6, 10. The adjusting bolt 8 is readily displaceable in the longitudinal slot 5 as well as in the lateral and drop slots 6, 10. While the mounting arrangement has been illustrated as being a separate element adapted to be fixedly attached to a frame part of the vehicle, it is understood that the mounting plate 2 may also be directly incorporated, together with the longitudinal slot 5, lateral slots 6, and drop slots 10 into a side rail of the vehicle or into another suitable frame part of the vehicle.

While I have shown and described only one embodiment in accordance with the present invention, it is understood that the same is not limited thereto, but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. A vertically adjustable mounting arrangement for vehicle safety belts for enabling a stepwise variable adjustment of an abutment height of a deflecting or end member of the safety belt, the arrangement including a mounting plate, a vertically extending slot disposed in the mounting plate, a plurality of lateral slots extending from the vertically extending slot obliquely downwardly and toward a front of the vehicle, the lateral slots defining a plurality of individual catching points for an adjusting member of the safety belt and for holding the deflecting or end member of the safety belt, characterized in that a drop slot is provided at an end of each of the lateral slots opposite the vertically extending slot, the drop slots are offset downwardly from the lateral slots and have a length which is at least twice a width of the lateral slots whereby an automatically effective gravity-caused locking of the adjusting bolt is obtained at an end position of the lateral slots.

2. A mounting arrangement according to claim 1, characterized in that stop lug means are arranged at an inner area of a transition region between the obliquely downwardly extending portion of the respective lateral slots and the associated drop slots for securing the adjusting means of the safety belt in the drop slot, the stop lug means extends one of at least substantially at a right angle and at an acute angle with respect to the lateral slot.

3. A mounting arrangement according to one of claims 1 or 2, characterized in that a bore means is provided in the mounting plate for enabling an insertion of the adjusting means into the longitudinally extending slot, the adjusting means includes an adjusting member having a head portion, the head portion is provided with a peripheral groove having a width corresponding to a thickness of the mounting plate such that lateral flanges of the head portion extend beyond rims of the longitudinally extending slot, lateral slots, and drop slots.

4. A mounting arrangement according to claim 3, characterized in that a plug means is provided for sealing the bore means.

5. A mounting arrangement according to claim 4, characterized in that the mounting plate means is adapted to be fixedly secured at a side rail of the vehicle.

6. A mounting arrangement according to claim 4, characterized in that the mounting plate means is formed in a lateral frame part of the vehicle.

* * * * *